July 25, 1950 — T. F. SCHLICKSUPP — 2,516,487
METHOD AND APPARATUS FOR LABELING FABRICS
Filed Feb. 20, 1947 — 3 Sheets-Sheet 1
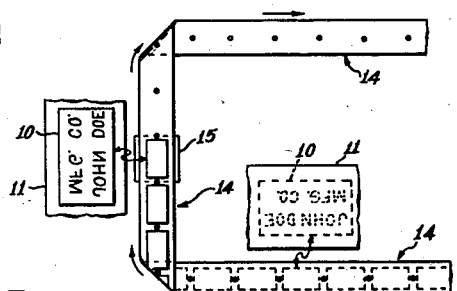
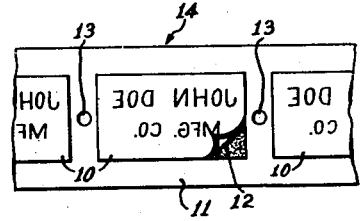
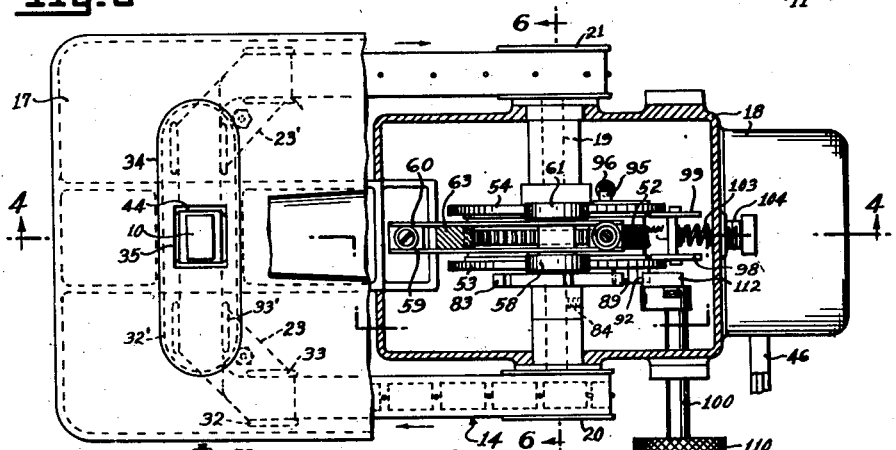
INVENTOR
Theodore F. Schlicksupp
BY
ATTORNEYS

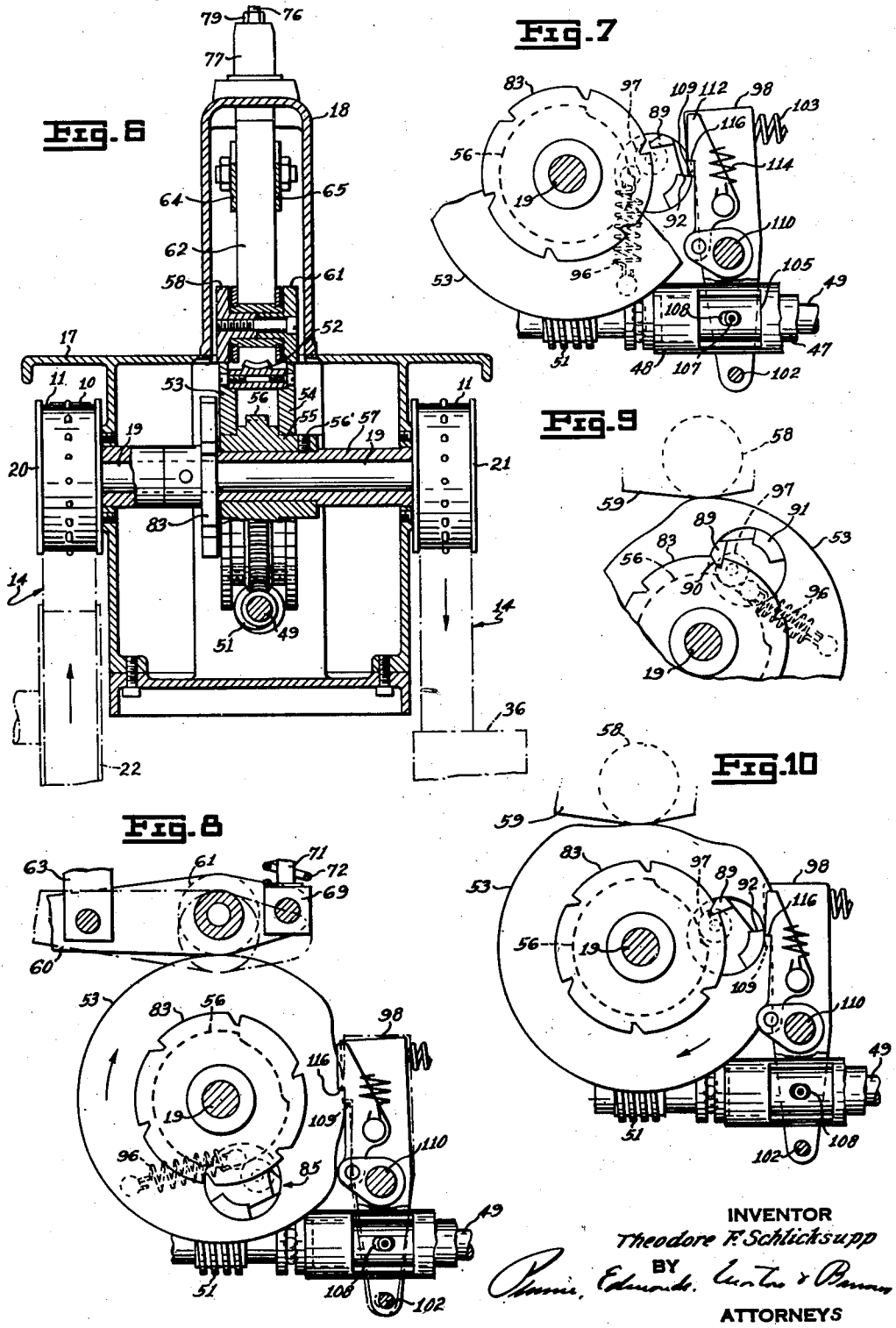

July 25, 1950     T. F. SCHLICKSUPP     2,516,487
METHOD AND APPARATUS FOR LABELING FABRICS
Filed Feb. 20, 1947     3 Sheets—Sheet 3
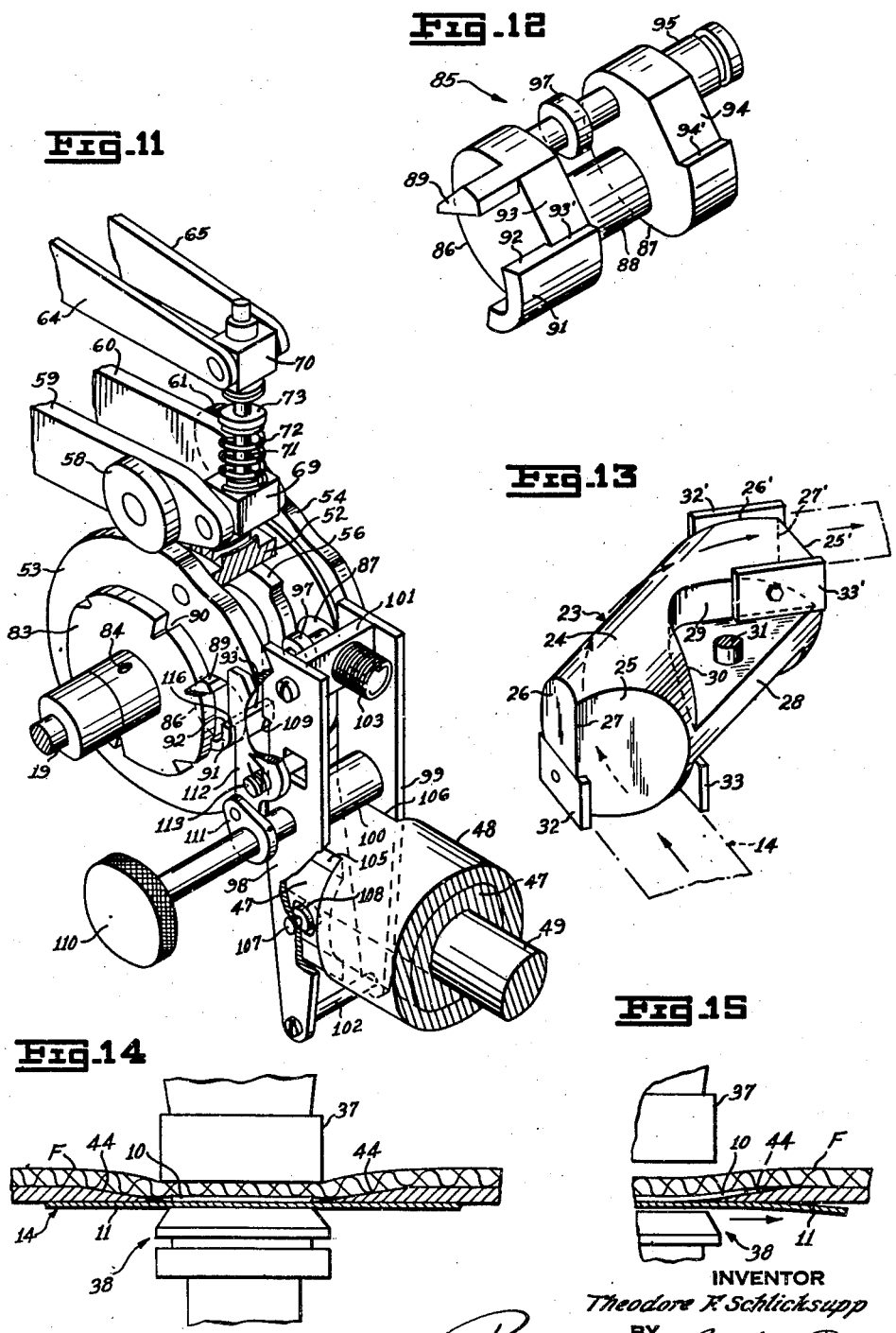
INVENTOR
Theodore F. Schlicksupp
BY
ATTORNEYS Patented July 25, 1950

2,516,487

UNITED STATES PATENT OFFICE 2,516,487

METHOD AND APPARATUS FOR LABELING FABRICS

Theodore F. Schlicksupp, Long Island City, N. Y.

Application February 20, 1947, Serial No. 729,724

9 Claims. (Cl. 216—9)

This invention relates to a method and apparatus for labeling fabrics.

Labels of the kind that are usually found on men's neckties and on the inside pockets of men's coats are in most cases made of fabric and are applied by sewing them to the fabric of which the garment is made. The reading matter on the label is usually woven into the label.

One object of this invention is to provide a simpler, more expeditious, and less expensive method of permanently labeling fabrics.

Another object is to provide apparatus adapted to apply labels to fabrics in accordance with the improved method.

According to the invention the method in its simplest form comprises first printing the reading matter of the label directly on a thin sheet or film of transparent thermoplastic material such as the material known as "Vinylite," or some material having similar properties. The sheet of thermoplastic material may be given the size and shape of the finished label after the reading matter is printed on it, but the printing operation is preferably performed on a piece of the thermoplastic material that has previously been given the shape and size of the finished label. The piece of thermoplastic material having its final shape and size and containing the printed reading matter constitutes the actual label to be applied to the fabric, but for convenience the term "label" will sometimes be used in the following description to refer to the piece of thermoplastic material of final shape and size even though the reading matter has not yet been printed on it.

The thermoplastic label upon which the reading matter has been directly printed, as above described, is then applied to the fabric by heat and pressure so that the thermoplastic material fuses to the fabric. Preferably the reading matter is printed in reverse on that side of the piece of thermoplastic material that is to be positioned next to the fabric so that when the piece of thermoplastic material is applied to the fabric the printing will be on the underside of the label and will be in proper reading position when viewed through the transparent label. The printed reading matter will also be protected by the thin layer of thermoplastic material which remains over it.

In a more commercial form of the method the thermoplastic transparent labels are first attached in spaced relation to a continuous backing strip in such a manner that they can be easily removed from the backing strip after they have been applied to the fabric. The reading matter is then printed in reverse directly on the transparent thermoplastic labels. To apply the labels to the fabric the label strip previously prepared as just described is fed intermittently through a label-applying machine of the type hereinafter described and the labels are brought successively to a station where each one is applied to the fabric by heat and pressure while the feeding of the label strip is temporarily arrested. When the feeding of the label strip is resumed after each application of one of the labels to the fabric, a knife blade engages betwen the label last affixed to the fabric and the backing strip and causes the label to become detached from the backing strip and remain affixed to the fabric. The portion of the backing strip beyond the label-applying station and from which all of the labels have been removed is fed to waste.

The method, and also a preferred form of the machine that is adapted to apply the labels to the fabric, are illustrated in the accompanying drawings, in which:

Figure 1 is a fragmentary view of a portion of the label strip with the corner of one label raised to show the layer of applied solvent which temporarily affixes the labels to the backing strip;

Fig. 2 is a more or less diagrammatic and explanatory view further illustrating the method and showing the label strip during its movement through the machine that applies the labels to the fabric;

Fig. 3 is a plan view, partly in horizontal section taken on the line 3—3 of Fig. 4, of a machine for applying the labels to the fabric;

Fig. 4 is a vertical section taken approximately on the line 4—4 of Fig. 3;

Fig. 5 is a transverse vertical section through the lower presser member taken on the line 5—5 of Fig. 4;

Fig. 6 is a transverse vertical section taken on the line 6—6 of Fig. 3;

Figs. 7–10, inclusive, are fragmentary views illustrating successive positions of certain parts of the machine during a cycle of operations;

Fig. 11 is an enlarged perspective view showing a portion of the operating mechanism of the machine and the mechanism for starting and stopping the machine at the beginning and end of each cycle of operations;

Fig. 12 is a perspective view of the rotatable dog member that constitutes part of the mechanism shown in Fig. 11;

Fig. 13 is a perspective view of one of the two guide members around which the label strip passes in making the two turns depicted in Fig. 2;

Fig. 14 is an explanatory view showing the manner in which the presser members press one of the thermoplastic labels against the fabric so that the heat furnished by one of the presser members fuses the label to the fabric; and Fig. 15 is a view corresponding to Fig. 14 but showing the presser members partly separated and showing the manner in which the knife blade removes from the backing strip one of the labels that has just been affixed to the fabric.

In practicing the method in its preferred form a number of labels 10 (Fig. 1) made of some thin transparent thermoplastic material such as "Vinylite," as above described, are attached to a backing strip 11 so that they are spaced a short distance apart lengthwise of the backing strip as shown in this figure. The labels are caused to adhere to the backing strip preferably by applying to the backing strip at each area where one of the labels is to be attached to it a solution containing a weak solvent of the thermoplastic material of which the labels are made. In Fig. 1 the corner of one of the thermoplastic labels is shown turned back to expose the corner 12 of one of the areas to which the solvent is applied. The thermoplastic labels are then applied to and pressed against these areas and the solvent softens the underside of the labels sufficiently to cause them to adhere to the backing strip. The backing strip is preferably made of a material like glassine paper, or paper containing a thin wax coating, so that the labels can be readily removed from the backing strip when they are affixed to the fabric as hereinafter described. The thermoplastic labels preferably have a thickness of about .003" and the backing strip may have about the same thickness or be somewhat thicker if desired. The reading matter of the label is printed on each label by passing the backing strip with its adhering labels through a suitable printing press. The reading matter is printed in reverse on the labels as shown in Fig. 1. The backing strip is preferably provided with perforations 13 to facilitate the feeding of the strip through the machine in which the label strip is made and also through the machine hereinafter described for applying the labels to the fabric. To adapt the label strip for use in a label-applying machine of the particular kind to be described herein, the perforations 13 are preferably provided in a single row along the center line of the backing strip and are spaced apart so that a perforation occurs between each two labels carried by the backing strip as shown in Fig. 1.

The next step in the complete method is the transfer of the thermoplastic labels from the label strip to the fabric and the fixation of them to the fabric. Fig. 2 illustrates this portion of the method diagrammatically. A continuous label strip 14 prepared as above described and of considerable length, is intermittently fed past a station where the thermoplastic labels are successively applied to the fabric. This station is diagrammatically represented in Fig. 2 by the rectangle 15. When the label strip passes the station 15 the thermoplastic labels are facing upwardly, and while the label strip is at rest an operator places the fabric to which one of the labels is to be applied over the label and then causes a pair of presser members to grip the label strip and the fabric and press the label against the fabric while heat is applied to the label by one of the presser members to cause it to fuse to the fabric. Resumed motion of the label strip causes the knife blade previously mentioned to separate the label that has been affixed to the fabric from the backing strip, and the portion of the backing strip beyond the label-applying station from which all of the thermoplastic labels have been removed is then fed to waste as previously described. At the time the label is applied to the fabric the printed reading matter is on the top side of the label facing upwardly and will lie next to the fabric when the fabric is positioned over the label. Moreover, the reading matter is printed in reverse as indicated in the enlarged representation of one of the labels alongside the label-applying station 15 in Fig. 2. When the fabric is turned over after the label has been applied to it the printed reading matter will be at the underside of the label and will be readable through the transparent label and will be protected by the film of the thermoplastic material which remains above the printed reading matter. The manner in which the labels are applied to the fabric at the label-applying station 15 will become more apparent from the following detail description of the label-applying machine.

Before leaving Fig. 2, however, it should be noted that this figure indicates the path followed by the label strip in moving through the label-applying machine. The label strip is represented in horizontal plan view, and as will be seen the label strip has three runs, an approach run which is the lowermost run shown in Fig. 2, an intermediate run which is the vertical run shown in Fig. 2, and a discharge run which is the uppermost run shown in Fig. 2. The three runs have the general shape of a U, the approach and discharge runs being parallel to the sides of the machine as will hereinafter appear, and the intermediate run extending transversely across the machine and past the label-applying station. During the approach run the backing strip is facing upwardly and the labels are at the underside of the backing strip. The printed reading matter on the labels, if visible through the backing strip, would now appear as indicated in the enlarged representation of one of the labels shown alongside the approach run of the label strip in Fig. 2. As the label strip continues through the machine it has its direction of movement changed so that it now travels transversely through the machine and in a direction at right angles to the direction in which the approach run of the label strip travels. The right angle change in the direction of movement of the label strip is accompanied by a twisting or turning upside down of the label strip. Therefore, the labels are then at the upper side of the backing strip with the printed reading matter on the top surface of the label and reversed and they pass the label-applying station in such position as previously described. After the backing strip reaches a point beyond the label-applying station its direction of movement is again changed so that it travels in a direction parallel to the direction in which the approach run travels.

Referring now to Figs. 3–6 inclusive, the label-applying machine in its preferred form comprises a base 16 (Fig. 4) which supports a work table 17 and a number of housing parts which are assembled to form a housing 18 for most of the moving parts of the machine. Extending transversely through the machine there is a sprocket shaft 19 for the label strip (Figs. 3, 4 and 6). Sprocket wheels 20 and 21 are mounted on the ends of the shaft 19 at points outside of the machine housing. The sprocket wheel 21 is rigidly secured to the shaft 19, whereas the sprocket wheel 20 may or may not be rigidly secured to it as will hereinafter appear. The label strip is preferably wound in the form of a reel preparatory to its use in the label-applying machine. Such a reel of the label strip is represented at 22 in Fig. 6. It may be rotatably supported in any suitable way below the sprocket wheel 20 and so that it rotates in the same general vertical plane as the sprocket wheel 20. The label strip 14 is fed from the reel 22 up and around the sprocket wheel 20 and then horizontally toward the work table 17 (Fig. 3). The label strip is so reeled originally and so introduced into the machine that when the label strip is moving from the sprocket wheel 20 toward the work table, which is the above-mentioned approach run of the label strip, the labels are on the underside of the backing strip as previously described. The label strip is fed under the table 17 and around a guide member 23 secured to the work table at the underside of the table. The function of the guide member is to change the direction of movement of the label strip so that it will then move transversely of the machine under the work table. Since the guide member 23 is under the work table and appears only in dotted lines in Fig. 3, its construction is not very clear from this figure so the guide member has been shown by itself in prespective in Fig. 13. As will be seen from this figure the guide member comprises a cylindrical bar 24 the two ends of which are bevelled to provide at one end a pair of end faces 25 and 26 which converge at an angle of 90° and intersect at a vertical edge or corner 27, and at the other end a pair of similar end faces 25' and 26' which intersect at a vertical edge or corner 27'. The edges 27 and 27' are slightly less in length than a full diameter of the cylindrical bar and are located slightly closer to one side of the bar than the other so that the faces 25 and 25' are slightly wider than the faces 26 and 26'. The side of the bar is provided with upper and lower recesses which leave between them a horizontally extending web 28. The side walls 29 and 30 of each recess are substantially at right angles to each other. The web 28 is utilized to fasten the guide member under the work table 17 by means of a bolt, a portion of which is shown at 31. A guide plate 32 fits in a recess at the lower portion of the end face 26 and is bolted to the cylindrical bar. A similar guide plate 33 is bolted to the side wall of that recess which lies under the web 28 so that it is in parallel relation to the plate 32. The two plates 32 and 33 project slightly below the lower surface of the cylindrical bar and form a guideway for the label strip 14 approaching the guide member. Similar guide plates 32' and 33' are bolted to the far end of the cylindrical bar as viewed in Fig. 13, but in this case the plate 32' fits in a recess at the upper portion of the end face 26', and the plate 33' fits against the side wall 29 of the recess above the web 28. The two plates 32' and 33' project slightly above the upper surface of the cylindrical bar, as shown, and form a guide way for the label strip leaving the guide member. As indicated by the arrows in Fig. 13 the label strip enters the guideway formed by the lower plates 32 and 33, winds upwardly around the bar and follows its contour, and then leaves the bar between the upper guide plates 32' and 33'. Therefore, in passing around the guide bar the label strip is twisted and changed in direction so that it leaves the guide bar in a direction at right angles to that in which it was moving when it reached the guide bar. It is also turned upside down. If the guide bar shown is prespective in Fig. 13 is oriented so that it occupies the dotted line position shown in Fig. 3, it will be seen that the label strip after leaving the sprocket wheel 20 will be reversed by the guide member and will be directed by it in a direction transversely of the machine under the work table 17.

The portion of the label strip which passes transversely across the machine under the work table moves under a plate 34 (Figs. 3 and 4) which fits in a recess in the work table and is provided with a rectangular shaped opening 35. The label strip passes under this opening and it is here that the labels are successively applied to the fabric by the means hereinafter described. The backing strip from which the labels have been removed then passes around a second guide member 23' (Fig. 3) similar to the guide member 23 previously described. This guide member, however, receives the backing strip between its upper two guide plates, then guides it downwardly around the cylindrical bar and discharges it between its two lower guide plates. After leaving the guide member 23' the backing strip passes over the sprocket wheel 21 and then down to a suitable discharge point, which might be a waste receptacle indicated at 36 in Fig. 6. It will now be seen that if the sprocket shaft 19 is rotated clockwise as viewed in Figs. 3 and 4, and if the sprocket wheel 21 is fixed to the shaft and the sprocket wheel 20 is loose thereon, the feeding of the label strip through the machine will be accomplished solely by the pulling action of the sprocket wheel 21. The loose fit of the sprocket wheel 20 on the shaft 19 permits this sprocket wheel to be rotated in a counterclockwise direction by the label strip moving over it on its way toward the work table. If desired both sprocket wheels may be secured to the feed shaft 19 and both utilized to feed the label strip through the machine. In this case, however, the label strip on its way to the work table should be fed under the sprocket wheel 20 by suitable idler rolls or guide rolls, instead of over it. The clockwise rotation of the sprocket wheel 20 will then feed the approach run of the label strip toward the work table while the clockwise rotation of the sprocket wheel 21 will pull the discharge run of the label strip away from the work table.

An operator seated at the work table 17 places the fabric to which a label is to be affixed on the work table so that the portion of the fabric where the label is to be applied lies over the rectangular opening 35. A previous cycle of operations of the machine has arrested the motion of the label strip with one of the labels lying under and framed by the rectangular opening 35. As previously stated the label is now at the upper side of the backing strip. When the operator trips the machine as hereinafter described to start a cycle of operations, upper and lower presser members 37 and 38, respectively (Fig. 4), are brought together to press the label strip against the fabric. The lower presser member 38 is heated electrically. This may be accomplished in any suitable way, but one construction of a presser member which makes this possible is shown in Fig. 5. It comprises an outer holding sleeve 39 within which an inner part 40 fits which constitutes the presser member proper. This member is preferably separated from the sleeve 39 by a layer of heat and electric insulating material 41. The heating element indicated at 42 fits within a bore in the inner member 40. The heating element is connected in a suitable electric circuit by means of the conductors shown at 43 and is designed to heat the lower presser member to the proper temperature to cause that face of the thermoplastic label which lies adjacent the fabric to fuse to the fabric when the two presser members are clamped against the label strip and the fabric for a predetermined interval of time. Fig. 14 shows the two presser members pressing the label strip 14 against the fabric represented at F so that the label 10 is fused to the fabric as just described. During this operation the upper presser member depresses the fabric down into the rectangular opening 35 but all four edges of the rectangular opening have a gradual bevel as shown at 44 so that the fabric will not be cut or damaged by the edges of the opening. When the predetermined interval of time during which the presser members press and fuse one of the labels to the fabric elapses, the operating mechanism automatically moves the two presser members apart and then rotates the sprocket shaft 19 an amount which will advance the label strip just far enough to bring the next label into registry with the rectangular opening 35, whereupon the feeding motion of the label strip is automatically arrested, thus completing one cycle of operations. During the feeding motion of the label strip the label 10 that has been affixed to the fabric rides up the bevel face 44 of one of the transverse edges of the rectangular opening 35 and the backing strip 11 passes under this edge as depicted in Fig. 15. In other words, this edge of the rectangular opening 35 acts as a knife blade that enters between the label 10 and the backing strip 11 and positively separates the label from the backing strip while permitting it to remain affixed to the fabric.

The rectangular opening 35 in the work table together with the presser members constitute the label-applying station represented by the rectangle 15 in Fig. 1.

The specific mechanism for moving the presser members into and out of engagement with the label strip and the fabric and for intermittently feeding the label strip through the machine may take various forms. However, one type of operating mechanism that is well suitable for the purpose will now be described.

A pulley 45 (Fig. 4) is continuously driven from an electric motor or other source of power by means of a belt 46. The pulley is mounted to rotate on a non-rotatable sleeve 47 which is slidable within an outer bearing sleeve 48 fixed to the machine housing. A shaft 49 extends through the sleeve 47 and at its outer end carries a clutch disc 50. When the sleeve 47 carrying the pulley is shifted axially on the shaft the pulley is shifted with it and the outer face of the pulley is moved into or out of engagement with the clutch disc 50. Normally the clutch is disengaged. The shaft 49 carries a worm 51 which meshes with a worm gear 52. As shown in Fig. 6 the worm wheel 52 is annular and is secured between two cam discs 53 and 54 which operate the presser members, as will soon appear. These cam discs are mounted to rotate freely on the ends of a bushing 55. The intermediate portion of the bushing 55 is shaped to provide a cam 56 the function of which will be hereinafter described. The bushing 55 is secured by means of a set screw 56' to a sleeve 57 that is fixedly held by the machine housing. Therefore, the cam 56 is a stationary cam. It will now be apparent that when the pulley 45 is shifted to engage the clutch disc 50, the shaft 49 is rotated, and through the worm 51 and the annular worm gear 52 the shaft rotates the two cam discs 53 and 54 on the bushing 55.

As will be seen from Fig. 4 the cam disc 53 operates a cam roller 58 mounted on a lever 59. A second lever 60 similar to the lever 59, and parallel with it, carries another cam roller 61 which is operated by the other cam disc 54 as shown in Fig. 11. A bearing member 62 (Fig. 4) is secured to the underside of the top of the machine housing and has an arm 63 which extends downwardly into the space between the two levers 59 and 60. The two levers are pivotally connected intermediate their ends to the lower end of this arm. The rear ends of the two levers 59 and 60 are operatively connected to the rear ends of two levers 64 and 65 (Figs. 4 and 11) between which the bearing member 62 extends and to which these levers are pivotally connected intermediate their ends. The forward ends of the levers 64 and 65 are operatively connected to the upper presser member 37 in the manner hereinafter described. The forward ends of the two levers 59 and 60 are operatively connected to the rear ends of two levers 66 and 67 (Fig. 4) which are pivotally connected intermediate their ends to a bearing support 68 secured to the underside of the work table 17. The forward ends of these two levers are pivotally connected to the holding sleeve 39 of the lower presser member as shown in Figs. 4 and 5. Thus when the cam discs 53 and 54 move the cam rollers 58 and 61 upwardly the system of levers just described moves the two presser members together, and when the cam discs permit the cam rollers to move downwardly the lever system moves the presser members apart.

The connection between the rear ends of the levers 59—60 and the rear ends of the levers 64—65 is preferably a yielding connection which will permit a limited amount of continued upward movement of the cam follower rollers 58 and 61 after the upper presser member has been lowered into engagement with the fabric and can move no farther. Any suitable type of yielding connection can be used. In the particular machine illustrated, the rear ends of the levers 59 and 60 are pivotally connected to a block 69 located between them (Figs. 4 and 11) and the rear ends of the levers 64 and 65 are pivotally connected to a similar block 70. A pin 71 adjustably mounted in the upper block 70 slides in the lower block 69. A coil spring 72, positioned between the lower block 69 and a shoulder plate 73 on the pin, transmits the motion from the lower levers 59—60 to the upper levers 64—65. Should the upper presser member 37 be incapable of moving downwardly any farther while there is a tendency for the cam follower rollers 58 and 61 to continue their upward movement, the block 69 slides on the pin 71 and compresses the spring 72. A similar yielding connection is employed between the forward ends of the levers 59—60 and the rear ends of the levers 66—67 which actuate the lower presser member.

The upper presser member 37 is preferably secured in the lower end of a sleeve 74 (Fig. 4) which is mounted for vertical sliding movement in a portion of the machine housing which projects over the work table. The upper end of the sleeve 74 is closed as shown at 75. A rod 76 passes through a cap member 77, supported on the machine housing, and through the closed end 75 of the sleeve 74, and extends a considerable distance down into the sleeve where it is provided with a head 78. The upper end of the rod 76 is threaded to receive a nut 79 located above the cap member 77. By turning this nut the position which the head 78 on the rod occupies in the sleeve 74 can be adjusted. A coil spring 80 reacts at one end against the head 78 on the rod and at its other end against the closed end 75 of the sleeve 74. The forward ends of the levers 64—65 are pivotally connected to a block 81 which is free to slide on the sleeve 74. The lower surface of this block abuts against a shoulder 82 on the sleeve. It will thus be seen that when the cam discs 53 and 54 move the cam follower rollers 58 and 61 upwardly the forward ends of the levers 64—65 move downwardly and the block 81, engaging the shoulder 82 on the sleeve 74, moves the sleeve downwardly and thereby moves the upper presser member downwardly into engagement with the fabric. During this motion of the sleeve 74 the rod 76 remains stationary and therefore the coil spring 80 is compressed between the head 78 on the end of the rod and the closed end 75 of the sleeve. When the cam rollers 58 and 61 are permitted to move downwardly by the cam discs 53 and 54 the coil spring 80 moves the sleeve 74 and the upper presser member upwardly, restores the lever mechanism to normal position, and lowers the lower presser member. The spring 80 also keeps the cam rollers 58 and 61 in operative engagement with the cam discs that actuate them.

The high portions of the cam discs 53 and 54 extend circumferentially of the discs for about 300°. As soon as the cam discs start rotating clockwise from the position shown in Fig. 4 the cam rollers 58 and 61 ride up on the high portions of the cams and cause the lever mechanism above described to bring the presser members 37 and 38 together and hold them together until the cam discs have rotated through 300° or five-sixths of a revolution. The cam rollers then ride down into the low portions of the cams and permit the presser members to be moved apart by the spring 80. They remain apart during the last sixty degrees of the revolution of the cam discs.

A ratchet disc 83, best shown in Figs. 4 and 11, is secured to the sprocket shaft 19 by means of a set screw 84. After the machine is set in operation to perform one cycle of operations this ratchet disc remains stationary during the above-mentioned 300° rotation of the cam discs 53 and 54, but during the last sixty degrees of their rotation, after the presser members have separated, the ratchet disc is caused to rotate with the cam discs by the mechanism now to be described to thereby rotate the sprocket shaft 19 far enough to advance the label strip the distance of one label.

Mounted to rotate in the two cam discs 53 and 54 is a dog member 85 which is shown by itself in perspective in Fig. 12. As will be seen from this figure the dog member comprises two discs 86 and 87 connected by a post 88 eccentrically disposed with respect to the discs. The disc 86 fits in a circular opening in the cam disc 53, and the disc 87 fits in a similar circular opening in the cam disc 54. The discs of the dog member fit loosely in the openings in the cam discs so that the entire dog member can turn about its own axis. The disc 86 of the dog member is provided with a tooth or dog 89 which is adapted to engage in any one of six notches 90 spaced 60° apart around the periphery of the ratchet disc 83. As shown in Fig. 12, the dog 89 projects outwardly from the outer face of the disc 86. The disc 86 is also provided with an outwardly projecting portion 91 which provides a shoulder 92 for the purpose hereinafter described. The peripheries of the discs 86 and 87 are machined to provide notches or clearances 93 and 94, respectively, having the shape shown so as to leave a shoulder 93' on the periphery of the disc 86 (which is in effect a continuation of the shoulder 92) and a shoulder 94' on the periphery of the disc 87. A pin 95 projects from the outer face of the disc 87 and is connected by means of a coil spring 96 (Fig. 4) to a pin on the outer face of the cam disc 54. This spring tends to rotate the dog member about its own axis in a direction to keep the dog 89 in engagement with one of the notches in the ratchet disc 83. The dog member is also provided with a cam roller 97 (Fig. 12) which is actuated by the previously described stationary cam 56 located between the two cam discs 53 and 54. In the normal position of the parts shown in Fig. 4 the cam roller 97 is in a low portion of the cam 56 so that the cam and roller do not prevent the dog member from being biased by the spring 96 to the position shown in which the dog engages in one of the notches of the ratchet disc 83.

The discs 86 and 87 of the dog member (Fig. 12) are somewhat thicker than the cam discs 53 and 54 in which they are mounted so that the disc 86 projects inwardly slightly beyond the inner face of the cam disc 53, and similarly the disc 87 projects inwardly a slight distance beyond the inner face of the cam disc 54. A pair of vertical clutch-actuating arms 98 and 99 (Figs. 4 and 11) are pivoted intermediate their ends on a shaft 100. The upper and lower ends of these two arms are interconnected by cross pieces 101 and 102, respectively (Fig. 11). The arms 98 and 99 are spaced apart such a distance that their upper ends can swing in the space between the cam discs 53 and 54 so that the edges of the arms can cooperate in a manner soon to be described with those portions of the peripheries of the discs 86 and 87 of the dog member that project inwardly beyond the cam discs 53 and 54. The upper ends of the arms 98 and 99 are biased toward the dog member by a coil spring 103 (Figs. 3, 4 and 11) which bears at one end against the upper cross piece 101 and at its other end against the end wall of a bore in an adjustment screw 104 (Figs. 3 and 4). The lower ends of the two arms 98 and 99 straddle the bearing sleeve 48 in which the sleeve that carries the driving pulley 45 slides, the sides of the bearing sleeve having flats, shown at 105 and 106 in Fig. 11 to accommodate the arms. Each arm is operatively connected by means of a pin 107 to the sliding sleeve 47 of the driving pulley. These pins pass through slots 108 in the outer bearing sleeve 48. Thus when the arms 98 and 99 are moved about the axis of the shaft 100 their lower ends will slide the sleeve 47 of the driving pulley to move it into or out of engagement with the clutch disc 50.

The inner edge of each of the clutch-actuating arms 98 and 99 is notched to provide a clearance and a shoulder 109. When the machine is at rest the dog member 85 is in the position shown in Fig. 4, and the shoulders 109 on the clutch-actuating arms 98 and 99 then lie just below the level of the shoulders 93' and 94' on the dog member. Thus the upper ends of the arms 98 and 99 are held at the limit of their outward or clockwise movement against the action of the coil spring 103 and in this position of the arms 98 and 99 the clutch 45—50 is disengaged.

To start a cycle of operations a knob 110 on the shaft 100 (Figs. 3 and 11) is turned in a counterclockwise direction. This turns an arm 111 (Figs. 4 and 11) in a counterclockwise direction and pulls down a hook member 112 to which it is pivoted. A pin 113 on the hook member is connected by means of a coil spring 114

(Fig. 4) to a pin 115 projecting inwardly from the machine housing whereby the upper end of the hook member is biased inwardly to cause a hook or shoulder 116 (Fig. 11) on the hook member to engage over the shoulder 92 on the rotatable dog member 85. Thus when the knob 110 is turned, as just described, the shoulder 116 on the hook member 112, by reason of its engagement with the shoulder 92 on the dog member, rotates the dog member about its own axis far enough to bring the shoulders 93' and 94' on the dog member to the level of the shoulders 109 on the clutch-actuating arms 98 and 99 thereby permitting the upper ends of these arms to swing inwardly in a counterclockwise direction. The lower ends of these arms in swinging outwardly shift the pulley sleeve 47 (Fig. 4) to the right and move the pulley 45 into engagement with the clutch disc 50. This position of the clutch-operating arms and the dog member is illustrated in Fig. 7, but in this figure the hook member 112 is shown in its returned position after it has rotated the dog member. It should also be noted from this figure that the rotation of the dog member has removed the dog or tooth 89 out of the notch of the ratchet disc 83 with which it was in engagement.

The engagement of the clutch 45—50 causes the shaft 49 to start rotating, and through the gearing above described it starts the rotation of the cam discs 53 and 54. As they rotate, the dog member 85 moves with them, allowing the ratchet disc 83 to remain stationary. Fig. 8 shows the position of the parts after the cam discs 53 and 54 together with the dog member have rotated through an angle of about 90°. Immediately after the cam discs and the dog member start to move from the position shown in Fig. 7 the roller 97 on the dog member comes opposite the high portion of the fixed cam 56. The high portion of the cam has a circumferential length of about 300° and by its engagement with the roller 97 on the dog member prevents the tooth 89 on the dog member from dropping into any of the notches 90 in the ratchet disc until the dog member reaches the position shown in Fig. 9 in which the tooth on the dog member is opposite the last of the series of notches in the ratchet disc, i. e., the notch immediately preceding the one engaged by the tooth on the dog member in its starting position. At this point the cam roller 97 on the dog member rolls off the high portion of the cam 56 permitting the dog member to rotate in a counterclockwise direction about its own axis and thereby bring the tooth of the dog member into engagement with said last notch of the series in the ratchet disc. In this position of the parts the cam rollers 58 and 61 are ready to drop into the low portions of the cam discs 53 and 54 to allow the presser members to move apart. Further movement of the cam discs and the dog member will now rotate the ratchet disc and also the sprocket shaft 19, thus causing advancement of the label strip. Fig. 10 shows the position of the parts just at the time the peripheries of the discs 86 and 87 of the dog member come into engagement with the clutch-actuating arms 98 and 99. As the dog member moves from the position shown in Fig. 10 to the starting position shown in Fig. 4 the discs of the dog member push the upper ends of the clutch-actuating arms 98 and 99 outwardly and thereby shift the pulley 45 to the left in Fig. 4 to disengage the clutch and stop the machine. The sixty degree rotation of the ratchet disc 83 by the dog member as the dog member moves from the position shown in Fig. 9 to the starting position shown in Fig. 4 advances the label strip through the machine an amount equal to the distance from the center of one label to the center of the next one.

Thus during one cycle of operations the presser members are brought together to press the fabric against the label strip and fuse one of the labels to the fabric, the presser members being held together long enough to accomplish this, and then as the presser members are moved apart the label strip is advanced to bring the next succeeding label into position between the presser members, thus completing a cycle of operations, at which time the operating mechanism is automatically rendered inoperative until the machine is again tripped.

The spacing of the notches 90 in the ratchet disc 83 depends upon how much rotation should be imparted to the sprocket shaft 19 to advance the label strip the desired amount after the presser members move apart. In the particular machine shown in the drawings the sprocket shaft 19 should be turned through an angle of 60° to accomplish this when a label strip is employed of the kind that is intended for use in the machine, and it is for this reason that the particular ratchet disc illustrated is provided with six notches spaced 60° apart as above described. Regardless of the number of notches in the ratchet disc the cam 56 should always be shaped so that it allows the tooth on the dog member to drop into the last ratchet disc notch it comes to before it reaches its starting position at the end of a cycle of operations.

Other means than the knob 110 may be employed for actuating the hook member 112 to trip the machine. It may be preferable to employ a foot treadle operatively connected to the hook member to actuate it, or it may be actuated electrically by a solenoid or in any other suitable way.

By locating the feed sprockets at the ends of a shaft passing transversely through the machine and feeding the label strip in the manner above described, namely, along one side of the machine, then transversely of the machine under the work table, and then to the discharge point along the opposite side of the machine, the machine can be made very compact. This would not be possible if the label strip were fed in a straight line under the work table from a sprocket located at one side of the table to a sprocket located at the other side. Not only would this require more space to accommodate the sprockets at the sides of the work table but they could not be so conveniently driven as in the machine herein described.

I claim:

1. The method of applying labels to fabric from a backing strip to which a number of transparent thermoplastic labels are removably attached in spaced relation and on the upper side of each of which reading matter has been printed in reverse, which comprises feeding the backing strip past a label-applying station, and at said station affixing each thermoplastic label by heat and pressure to the fabric with its printed side next to the fabric, and then separating it from the backing strip.

2. The method of applying labels to fabric from a backing strip to which a number of transparent thermoplastic labels are removably attached in spaced relation and on the upper side of each of which reading matter has been printed in reverse, which comprises feeding the backing strip intermittently past a label-applying station with the labels facing upwardly, positioning the fabric so that the portion thereof to which a label is to be affixed is located at the label-applying station and lies above a label at the station, and while the backing strip is at rest affixing the label that is at the station to the fabric by pressure applied on the fabric and against the underside of the backing strip and by heat applied to the thermoplastic label, and after the label is affixed to the fabric separating it from the backing strip.

3. Apparatus for applying labels to fabric from a backing strip to which a number of printed thermoplastic labels are removably attached in spaced relation, comprising a support for the fabric having an opening therein, means for guiding the backing strip so that a portion of it moves under said opening with the labels facing upwardly, pressure means adapted when the backing strip is at rest with one of the labels under said opening to press such label into contact with the fabric, heating means associated with said pressure means adapted to heat the thermoplastic label pressed against the fabric and fuse it to the fabric, and means for advancing the backing strip and arresting its motion when a label is under said opening.

4. Apparatus for applying labels to fabric from a backing strip to which a number of printed thermoplastic labels are removably attached in spaced relation, comprising a label-applying station, means for supporting the fabric so that the portion thereof to which a label is to be affixed is located at said station, means for guiding and supporting the backing strip so that one run thereof passes said station, means for intermittently feeding the backing strip so that its motion is arrested when a label is at the label-applying station, pressure means operable to press such label into contact with the fabric, and heating means associated with said pressure means adapted to heat the thermoplastic label pressed against the fabric and fuse it to the fabric.

5. Apparatus for applying labels to fabric from a backing strip to which a number of printed thermoplastic labels are removably attached in spaced relation, comprising a pair of presser members, heating means associated with one of the presser members, feeding means for feeding the backing strip and the attached labels between the presser members, means for supporting the fabric so that the portion thereof to which a label is to be affixed is located between the presser members, and operating means adapted when set in operation to move the presser members together to fuse one of the labels to the fabric then move them apart and then actuate the feeding means to advance the backing strip enough to bring the next label between the presser members.

6. A machine for applying labels to fabric from a perforated backing strip to which a number of thermoplastic labels are removably attached in spaced relation, comprising a work table at the front of the machine, a sprocket shaft extending transversely through the machine at the rear of the work table, sprocket wheels at the ends of such shaft, guide members associated with the work table and cooperating with said sprockets to guide the backing strip passing around the sprocket wheels first forwardly along one side of the machine toward the work table then transversely of the work table past a label-applying station and then rearwardly along the other side of the machine, and means at said label-applying station operable to press one of the labels on the backing strip against the fabric supported on the work table and to supply heat to the label to fuse it to the fabric.

7. Apparatus for applying labels to fabric from a backing strip to which a number of printed thermoplastic labels are removably attached in spaced relation, comprising a work table adapted to support the fabric and provided with a rectangular opening, means for guiding the backing strip so that a portion of it moves across the work table and under said opening, means for advancing the backing strip and arresting its movement when one of the labels is under said opening, pressure means adapted to press such label in contact with the fabric, and heating means associated with said pressure means adapted to heat the thermoplastic label pressed against the fabric and fuse it to the fabric, a transverse edge of said rectangular opening being bevelled to form a knife blade adapted during movement of the backing strip to engage between the backing strip and the label that has been fused to the fabric to separate it from the backing strip.

8. Apparatus for applying labels to fabric from a backing strip to which a number of thermoplastic labels are attached in spaced relation, comprising a support for the fabric, means for advancing the backing strip relative to the support past a label-applying station and arresting its movement when one of the labels reaches such station, means operable to press such label and the fabric together and apply heat to the label to cause it to fuse to the fabric, and means acting during movement of the backing strip to separate the label that has been affixed to the fabric from the backing strip.

9. Apparatus for applying labels to fabric from a backing strip to which a number of thermoplastic labels are attached in spaced relation, comprising a support for the fabric, means for advancing the backing strip relative to the support past a label-applying station and arresting its movement when one of the labels reaches such station, presser members operable to press such label and the fabric together, one of said members being adapted to engage the fabric and the other being adapted to engage the portion of the backing strip to which such label is attached, means for heating the presser member that engages the backing strip to cause the label that is pressed against the fabric to fuse to the fabric, and means acting during movement of the backing strip to separate the label that has been affixed to the fabric from the backing strip.

THEODORE F. SCHLICKSUPP.

REFERENCES CITED

The following references are of record in the file of this patent:

UNITED STATES PATENTS

| Number | Name | Date |
| --- | --- | --- |
| 947,276 | Briggs | Jan. 25, 1910 |
| 1,846,726 | Isaacks | Feb. 23, 1932 |
| 2,189,296 | Oskow | Feb. 6, 1940 |
| 2,201,407 | Pfeiffer | May 21, 1940 |
| 2,264,339 | Sherman | Dec. 2, 1941 |
| 2,439,082 | Emmy | Apr. 6, 1948 |